United States Patent
Trainer et al.

(10) Patent No.: US 8,427,117 B2
(45) Date of Patent: Apr. 23, 2013

(54) ELECTROMECHANICAL ARRANGEMENT

(75) Inventors: David R Trainer, Derby (GB); Thomas C J Feehally, Leicester (GB); Gareth E Moore, Nottingham (GB)

(73) Assignee: Rolls-Royce PLC, London (GB)

( * ) Notice: Subject to any disclaimer, the term of this patent is extended or adjusted under 35 U.S.C. 154(b) by 592 days.

(21) Appl. No.: 12/458,733

(22) Filed: Jul. 21, 2009

(65) Prior Publication Data
US 2010/0039076 A1  Feb. 18, 2010

(30) Foreign Application Priority Data

Aug. 12, 2008  (GB) .................................. 0814620.1

(51) Int. Cl.
*H02K 11/00* (2006.01)
*H02P 9/00* (2006.01)

(52) U.S. Cl.
USPC ............... 322/58; 318/621; 219/660; 322/44; 363/123

(58) Field of Classification Search .................... 322/44, 322/58; 318/621; 219/660; 363/123
See application file for complete search history.

(56) References Cited

U.S. PATENT DOCUMENTS

| | | | |
|---|---|---|---|
| 3,679,960 A | 7/1972 | Hirokawa et al. | 322/4 |
| 3,800,121 A * | 3/1974 | Dean et al. | 219/202 |
| 3,859,542 A * | 1/1975 | Kennedy | 307/401 |
| 3,881,137 A * | 4/1975 | Thanawala | 361/113 |
| 3,939,388 A * | 2/1976 | Abe et al. | 318/621 |
| 4,024,495 A * | 5/1977 | O'Brien | 340/449 |
| 4,080,559 A | 3/1978 | Wright et al. | 322/58 |
| 4,177,508 A * | 12/1979 | Schmid | 363/78 |
| 4,302,715 A | 11/1981 | Putman et al. | 323/210 |
| 4,737,711 A * | 4/1988 | O'Hare | 324/300 |
| 4,843,513 A * | 6/1989 | Edris | 361/20 |
| 4,942,560 A * | 7/1990 | Harthill | 367/137 |
| 5,198,746 A * | 3/1993 | Gyugyi et al. | 323/207 |
| 5,262,677 A * | 11/1993 | Ramirez | 307/105 |

(Continued)

FOREIGN PATENT DOCUMENTS

| | | |
|---|---|---|
| DE | 36 27 189 A1 | 2/1988 |
| EP | 0 298 935 A1 | 1/1989 |

(Continued)

OTHER PUBLICATIONS

Sainz et al., "Steinmetz Circuit Influence on the Electric System Harmonic Response", *IEEE Transactions on Power Delivery*, Apr. 2005, pp. 1143-1150, vol. 20, No. 2.

(Continued)

*Primary Examiner* — Pedro J Cuevas
(74) *Attorney, Agent, or Firm* — Oliff & Berridge, PLC (57) ABSTRACT

Electromechanical arrangements are utilized widely whereby a prime mover in the form of a mechanical assembly such as a gas turbine engine is utilized to drive an electrical machine as an electrical generator. Unfortunately the loads applied to the electrical generator may vary creating oscillation across phases of the electrical generator. Such oscillations generally will be translated to the mechanical assembly in the form of torque oscillations which may cause stressing. Stressing of the mechanical assembly will reduce its life and may alter its performance as well as fuel consumption. By provision of appropriate mechanisms for balancing electrical loads across an electrical machine as well reducing the time decay period for stored charge within an electrical assembly associated with an electrical machine it is possible to reduce torque oscillations as presented to the mechanical assembly and therefore improve its operational performance.

19 Claims, 10 Drawing Sheets

U.S. PATENT DOCUMENTS

| Patent No. | | Date | Inventor | Class |
|---|---|---|---|---|
| 5,309,346 A | * | 5/1994 | Gyugyi | 363/54 |
| 5,352,872 A | * | 10/1994 | Tsuji et al. | 219/660 |
| 5,604,433 A | * | 2/1997 | Theus et al. | 324/251 |
| 5,760,623 A | | 6/1998 | Hastings | 327/137 |
| 5,864,185 A | * | 1/1999 | Neugebauer et al. | 307/105 |
| 6,075,425 A | * | 6/2000 | Gopfrich et al. | 333/181 |
| 6,163,088 A | * | 12/2000 | Codina et al. | 307/64 |
| 6,323,625 B1 | * | 11/2001 | Bhargava | 322/32 |
| 6,373,238 B2 | * | 4/2002 | Lewis et al. | 324/107 |
| 6,605,928 B2 | * | 8/2003 | Gupta et al. | 322/10 |
| 6,837,099 B2 | * | 1/2005 | Kim et al. | 73/114.59 |
| 6,882,549 B2 | * | 4/2005 | Huggett et al. | 363/40 |
| 6,891,282 B2 | * | 5/2005 | Gupta et al. | 290/52 |
| 6,909,199 B2 | * | 6/2005 | Gupta et al. | 290/52 |
| 6,911,742 B2 | * | 6/2005 | Gupta et al. | 290/52 |
| 6,956,301 B2 | * | 10/2005 | Gupta et al. | 290/52 |
| 6,989,610 B2 | * | 1/2006 | Gupta et al. | 290/52 |
| 6,998,728 B2 | * | 2/2006 | Gupta et al. | 290/52 |
| 7,064,458 B2 | * | 6/2006 | Wittner | 307/65 |
| 7,193,825 B2 | * | 3/2007 | Darmann et al. | 361/19 |
| 7,358,705 B2 | * | 4/2008 | Maehara | 322/27 |
| 7,551,410 B2 | * | 6/2009 | Darmann | 361/19 |
| 7,800,880 B2 | | 9/2010 | Hu et al. | 361/111 |
| 8,106,540 B2 | * | 1/2012 | Larsen et al. | 307/105 |
| 8,140,240 B2 | * | 3/2012 | Molen et al. | 701/93 |
| 2001/0022472 A1 | * | 9/2001 | Codina et al. | 307/66 |
| 2002/0014887 A1 | * | 2/2002 | Lewis et al. | 324/107 |
| 2002/0070716 A1 | * | 6/2002 | Gupta et al. | 322/59 |
| 2003/0189339 A1 | * | 10/2003 | Gupta et al. | 290/52 |
| 2004/0066175 A1 | * | 4/2004 | Gupta et al. | 322/10 |
| 2004/0066176 A1 | * | 4/2004 | Gupta et al. | 322/10 |
| 2004/0066177 A1 | | 4/2004 | Gupta et al. | 322/10 |
| 2004/0090211 A1 | * | 5/2004 | Gupta et al. | 322/10 |
| 2004/0163451 A1 | * | 8/2004 | Kim et al. | 73/116 |
| 2004/0183378 A1 | * | 9/2004 | Wittner | 307/64 |
| 2005/0073152 A1 | * | 4/2005 | Gupta et al. | 290/52 |
| 2006/0044105 A1 | * | 3/2006 | Darmann et al. | 336/DIG. 1 |
| 2006/0197346 A1 | * | 9/2006 | Maehara | 290/40 B |
| 2006/0244425 A1 | | 11/2006 | Sihler | 322/58 |
| 2006/0273766 A1 | | 12/2006 | Kawamura | 322/46 |
| 2007/0115598 A1 | * | 5/2007 | Darmann et al. | 361/19 |
| 2007/0121354 A1 | | 5/2007 | Jones et al. | 363/47 |
| 2007/0287306 A1 | * | 12/2007 | Hu et al. | 439/94 |
| 2008/0309094 A1 | * | 12/2008 | Molen et al. | 290/40 C |
| 2009/0229847 A1 | * | 9/2009 | Long et al. | 174/6 |
| 2009/0295551 A1 | * | 12/2009 | Dickey | 340/310.11 |
| 2010/0039075 A1 | * | 2/2010 | Trainer et al. | 322/58 |
| 2010/0188062 A1 | * | 7/2010 | Candage et al. | 323/271 |
| 2010/0188786 A1 | * | 7/2010 | Darmann | 361/19 |
| 2010/0273657 A1 | * | 10/2010 | Martchevskii | 505/230 |
| 2010/0296208 A1 | * | 11/2010 | Tekletsadik et al. | 361/43 |
| 2011/0080000 A1 | * | 4/2011 | Cullen et al. | 290/31 |
| 2011/0177953 A1 | * | 7/2011 | Llambes et al. | 505/150 |
| 2011/0278931 A1 | * | 11/2011 | Johnson, Jr. | 307/66 |
| 2012/0065804 A1 | * | 3/2012 | Biswal et al. | 700/297 |
| 2012/0074779 A1 | * | 3/2012 | Black et al. | 307/31 |
| 2012/0194144 A1 | * | 8/2012 | Koren et al. | 323/212 |
| 2012/0285948 A1 | * | 11/2012 | Shan et al. | 219/660 |
| 2012/0316691 A1 | * | 12/2012 | Boardman et al. | 700/293 |

FOREIGN PATENT DOCUMENTS

| | | | |
|---|---|---|---|
| EP | 0 864 873 A1 | | 9/1998 |
| EP | 2154782 A1 | * | 2/2010 |
| GB | 2 053 527 A | | 2/1981 |
| GB | 2 437 845 A | | 11/2007 |
| JP | A-56-125999 | | 10/1981 |
| JP | A-2003-158896 | | 5/2003 |
| WO | WO 2008/039118 A1 | | 4/2008 |

OTHER PUBLICATIONS

European Search Report issued in Application No. EP 09 25 1783; mailed on Oct. 14, 2009.

* cited by examiner

ELECTROMECHANICAL ARRANGEMENT

The present invention relates to electromechanical arrangements and more particularly to configuration and operation of such electromechanical arrangements to limit torque as a result of electrical power generation upon a mechanical assembly.

It will be appreciated that provision of electromechanical arrangements which comprise generally a mechanical assembly as a prime mover and an electrical machine as an electrical power generator are known in a number of situations. Such electromechanical arrangements are relatively well known for provision of electrical power generators at remote locations. It is also known to provide electromechanical arrangements in which a prime mover mechanical assembly such as an internal combustion engine e.g. a diesel engine or a petrol engine or a gas turbine engine is used to both generate electrical power through an electrical machine as well as receive electrical power to supplement that prime mover's operation when appropriate. In order to take advantage of such generation as well as motoring gas turbine engines and in particular such engines utilised in aircraft are being designed to have more significant electrical machine components. Nevertheless, gas turbine engines must produce high levels of thrust consistently through their mechanical assembly.

Electrical power provided by the electrical machine in an electromechanical arrangement by its nature may vary in terms of the load required at different stages. In such circumstances problems arise with regard to generating high levels of thrust for aircraft propulsion whilst also generating a significant quantity of electrical power to supply electrical loads. Electrical loading is reflected as torque loading on the mechanical assembly and in particular for example a shaft of a rotating generator in a gas turbine engine. It will be appreciated that torque loading on the shaft is in turn transferred to mechanical transmission systems within the mechanical assembly and hence to the rotating spools of the engine. An electrical loading in some situations can affect engine performance, speed and fuel consumption as well as potential early failure of the mechanical assembly.

Historically it will be understood that engines in the form of mechanical assemblies have been relatively tolerant to the small amounts of torque created by electrical loading. The low levels of electrical power extraction, and where appropriate application, have created insignificant mechanical stresses. However, with increasingly high levels of torque created by large electrical loading and variations in that loading it will be understood that greater torque stress and interactions between the electrical machine and the mechanical assembly must be addressed and solved. Unfortunately, with regard to some situations such as with regard to an aircraft a high percentage of electrical loads are non linear and pulsed loads further complicating considerations of the torque in use stressing the mechanical assembly. It will be understood that electrical power drawn from an electrical machine which in turn obtains its prime movement for electrical power generation from an engine is neither smooth nor continuous.

In accordance with aspects of the present invention there is provided an electromechanical arrangement comprising a prime mover and an electrical machine coupled to the prime mover for reciprocal drive, the electrical machine having a plurality of phases, the electrical machine having a multi phase power regime generated by the prime mover or for driving the prime mover, the arrangement configured to maintain electrical power balancing across the phases of the multiple phase power regime, the arrangement comprising a phase balancing device presented across the phases of the electrical machine.

Preferably the phase balancing device comprises a first capacitor electrically connected between a first phase and a second phase, a second capacitor electrically connected between the second phase and a third phase and an inductance electrically connected between the first phase and the third phase.

Generally, the arrangement is configured by an electrical machine having balanced linear elements to draw or provide consistent sinusoidal electrical current for each phase of the multi phase power regime.

Alternatively, the arrangement is configured to limit and/or isolate unbalanced electrical faults or deviations to each phase of the multiple phase power regime.

Advantageously, the arrangement incorporates a neutral earthing resistor electrically connected to the electrical machine.

Further alternatively, the arrangement is configured by displacing any unbalance in the phases of the multi phase power regime to a position in the power couplings to the electrical machine which is remote from any association directly with the mechanical assembly.

Preferably the arrangement includes a converter to convert alternating electrical current to direct electrical current.

Typically, the multi phase power regime is three phase.

Further advantageously the arrangement incorporates a fault current limiter in each phase to reduce the time period of oscillatory electrical loading and mechanical stressing. Preferably the fault current limiter is a current limiting diode or a superconducting fault current limiter.

Preferably the electrical machine comprises a controller and a voltage controller associated with the controller, the controller being arranged to control the phases of the electrical machine, the voltage controller being arranged to reduce the excitation field in each phase of the electrical machine in which a fault is detected to reduce the time period of oscillating electrical loading and mechanical stressing.

Alternatively each phase of the electrical machine has an additional internal resistance to reduce the time period of oscillating electrical loading and mechanical stressing.

Preferably the prime mover is a gas turbine engine.

Aspects of the present invention also relate to a method of operating an electromechanical arrangement as described herein.

Aspects of the present invention will now be described by way of example and with reference to the accompanying drawings in which.

Figure 2:
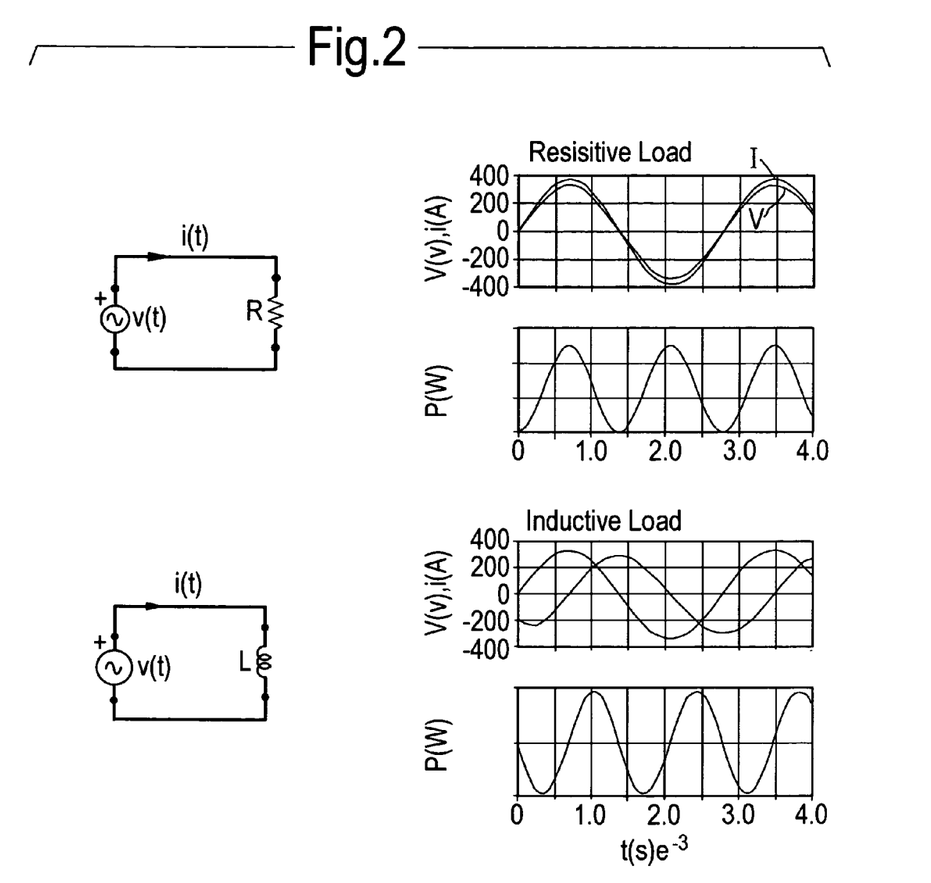
FIG. 2 illustrates second harmonic power generation with regard to resistance and inductance.

It will be understood that electrical power is usually transmitted and delivered to loads using a multiphase regime. Typically this multiphase regime is three phase in which individual phases are displaced by 120°. It is also known that single phase loads draw power and that each single phase load draws power that pulses at a second harmonic of the supply frequency. This relationship can be shown for a resistive load by multiplying the voltage and the current together. In the case of a single phase inductive or capacitive load as depicted in FIG. 2 the power also pulses at a second harmonic of the supply frequency but over a cycle the average is substantially zero.

Figure 1:
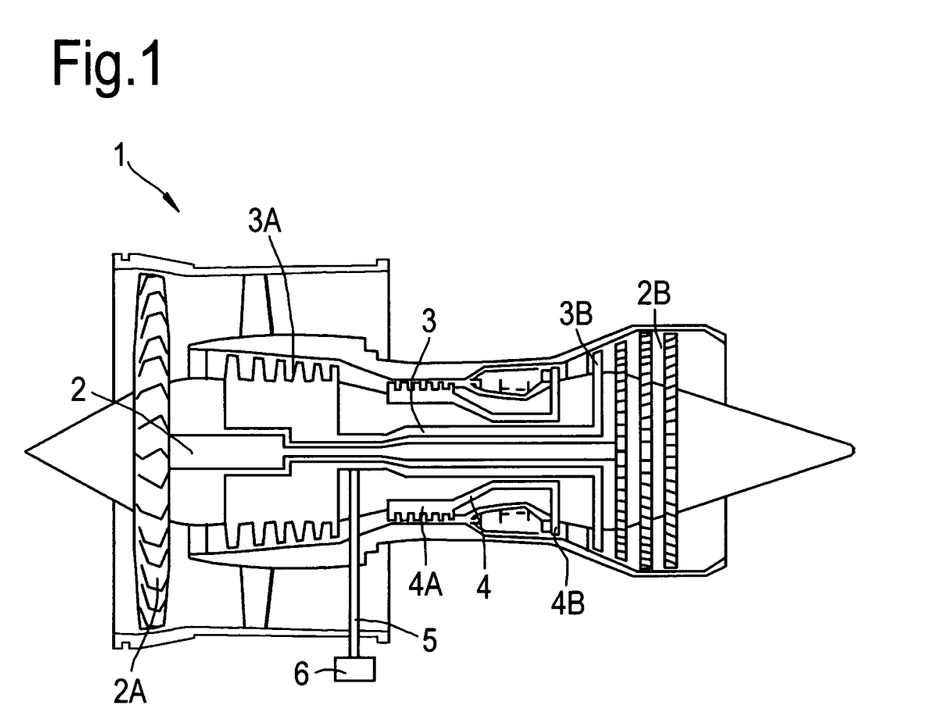
FIG. 1 is a schematic illustration of an electromechanical arrangement.

FIG. 1 provides a schematic illustration of an electromechanical arrangement in the form of a gas turbine engine 1. The gas turbine engine 1 comprises three spools, eg a low pressure spool 2 an intermediate pressure spool 3 and a high pressure spool 4. The low pressure spool 2 comprises a fan 2A driven by a low pressure turbine 2B. The intermediate pressure spool 3 comprises an intermediate pressure compressor 3A driven by an intermediate pressure turbine 3B and the high pressure spool 4 comprises a high pressure compressor 4A driven by a high pressure turbine 4B. These three spools 2, 3, 4 are arranged coaxially with the low pressure spool 2 arranged within the intermediate pressure spool 3 and the intermediate pressure spool arranged within the high pressure spool 4. Thus in operation air flows sequentially through the fan 2A, the intermediate pressure compressor 3A and the high pressure compressor 4A to a combustor. Hot gases produced in the combustor by burning fuel in the air flow sequentially through the high pressure turbine 4B, the intermediate pressure turbine 3B and the low pressure turbine 2B. Alternatively the gas turbine engine may comprise two spools, a low pressure spool and a high pressure spool or a single spool. A mechanical transmission 5 take power from the intermediate pressure spool 2 the high pressure spool 3, or possibly the low pressure spool 4 and transmits it to an electrical machine 6 in order to generate electrical power for operation of parts of the gas turbine engine 1 and other requirements of an associated aircraft. The mechanical transmission 5 also take power from the electrical machine 6 and transmits it to the intermediate pressure spool 3, the high pressure spool 4 or the low pressure spool 2 during starting of the gas turbine engine 1 or for other purposes. As indicated above fluctuations in the demand by the electrical machine 6 translate through the transmission 5 to the mechanical assembly 2 and spools 3, 4 resulting in stress and potential inefficiency with regard to performance, speed and fuel consumption. As indicated above generally the electrical machine 6 will operate in accordance with a multiphase regime and ideally that regime should be balanced whereby power over a cycle of all three phases is substantially zero.

Figure 3:
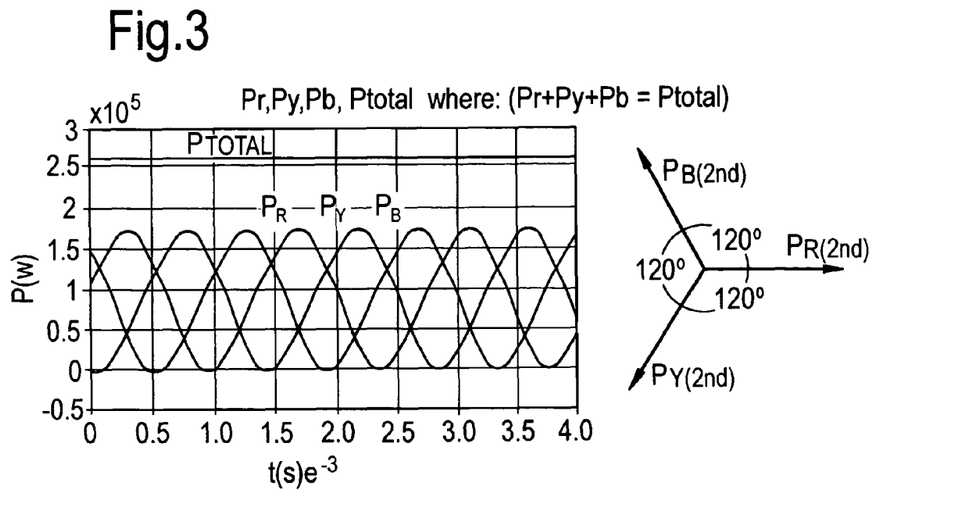
FIG. 3 illustrates a second harmonic power cancellation for a three phase electrical power regime.

Under balanced three phase conditions, that is to say where the three phases are identical as indicated above the second harmonic components of power cancel on an instantaneous basis so the total power drawn is constant. Such balanced operation is a major advantage of generating and transmitting electrical power using a multiphase and in particular three phase electrical network and therefore is a major reason why such multiphase regimes are adopted. FIG. 3 provides an illustration with regard to the phase relationship of the second harmonic components of power contributed by the three individual phases of the power supply with a 120° displacement and cancellation between each other to give as indicated a total power P total which is substantially constant. Such advantages are important as it can be shown that a balanced three phase load always draws a flat or constant power profile independent of whether those loads are resistive, inductive or capacitive in nature.

It will be appreciated the above is an idealistic situation but nevertheless power generation systems are generally considered in a balanced state between the mechanical power provided by the prime mover or mechanical assembly and the electrical power used by the loads. There may be some small differences as a result of power losses in the conversion process and in such circumstances energy stored both in the mechanical and electrical networks. Such storage is generally less than 5% of the capacity of the electromechanical arrangement.

It is known that the mechanical power delivered to an electrical machine such as an electrical generator is the product of the rotational speed and applied torque. In many large civil aircraft the gas turbine engines are arranged to have a high capacity such that operation is substantially speed stiff or constant and therefore the electrical power generators rotate at a fixed rate irrespective of electrical loading. As indicated above previously, electrical machines and electrical generators have placed limited demands upon the prime mover mechanical assembly such that the small stresses can be accommodated without real consideration. In such arrangements the electrical power supplied is directly proportional to the torque applied to the generator shaft. For a fixed speed system the torque is directly proportional to the electrical power. Unfortunately, it will be appreciated with practical electrical machines and particularly with those machines which have a higher capacity there will be non linear or unbalanced loads which will create corresponding high frequency torque ripple at the mechanical assembly and in particular a driver shaft in that mechanical assembly. It is desirable to connect well balanced and highly linear loads to an electrical system but this is not always possible. It will also be understood that practically there will always be small amounts of unbalanced load present on a continuous basis due to circuit tolerances and the potential connection of low levels of single phase loads such as electrical lighting. Furthermore there is also short term but much higher level imbalance created during single phase faults on an electrical network. For example, a line to line (LL) or line to ground (LG) fault which may persist for a significant period of time such as a few hundred milliseconds until protection regimes operate to remove the imbalance within the electrical machine/distribution system.

With reference to FIGS. 1 to 3 above it can be seen that the second harmonic components of power do not cancel if the electrical load effects are present only on one or two phases of a three phase network. Such unbalance causes the electrical power flow to oscillate and reverse at high frequency. Generally that frequency is twice the electrical supply frequency and can reach a very high peak value even when on average the discrepancy is relatively low.

As indicated above within a mechanical assembly such as a gas turbine engine utilised in an aircraft, power oscillation will appear as equivalent to torque oscillations and reversals in the mechanical system and therefore can create significant and large mechanical stresses, fatigue and wear. It will also be understood in some circumstances these oscillations can initiate mechanical resonance further exacerbating problems with regard to engine and mechanical assembly operation.

Figure 4:
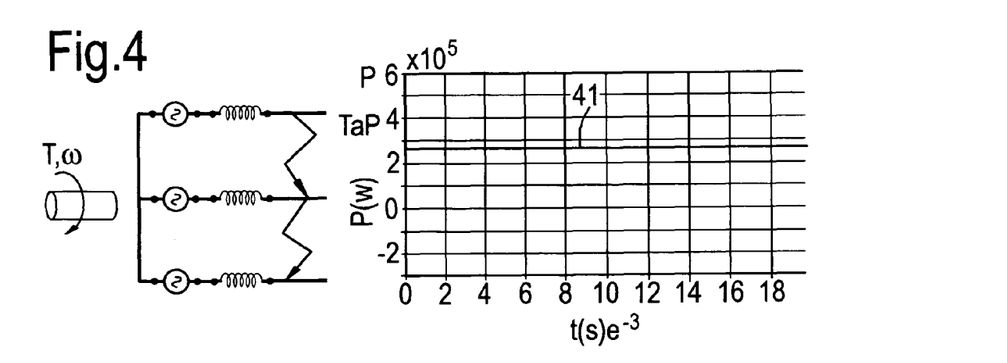
FIG. 4 provides a schematic illustration of a balanced three phase fault.
Figure 5:
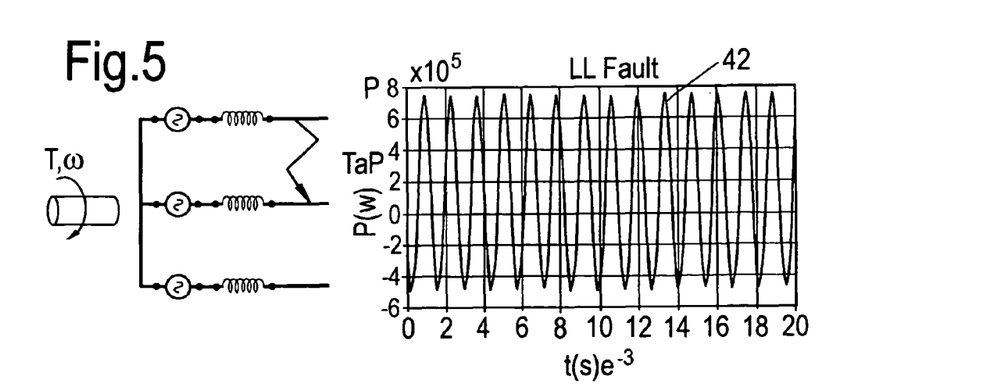
FIG. 5 provides an illustration of an unbalanced fault.

FIG. 4 provides an illustration of a steady state electrical power flow for a balanced three phase electrical fault on an electrical network and the equivalent torque duty at the mechanical assembly, that is to say a driver shaft. FIG. 5 provides an illustration for similar circumstances with an unbalanced line to line (LL) fault. For an electrical machine operating at 360 Hz to 800 Hz, the imbalance creates large torque oscillations at 720 Hz to 1600 Hz. Essentially as can be seen line 41 with a balanced three phase fault is steady and therefore provides limited additional stressing upon the mechanical assembly. Line 42 with a line to line fault as indicated produces significant oscillations which will create stressing within the mechanical assembly.

In view of the above aspects of the present invention attempt to achieve limitation of mechanical stressing imposed upon a mechanical assembly and in particular the transmission or drive system by control of the electrical network and in particular electrical machine operation by design and operation. The electrical machine and electrical network will be designed and operated to avoid or at least minimise non linear or unbalanced loads and therefore create greater consistency and reduce imbalances in the electrical load application and therefore reciprocally reductions in the torque oscillations presented to the mechanical assembly. Principally aspects of the present invention provide four approaches to reducing torque oscillations and will generally be combined with processes for shortening the decay time for certain faults.

The principal processes with regard to reducing torque oscillation relate to:

a) Ensuring that installed and operated electrical loads are balanced three phase linear elements. Such an approach will ensure that all electrical loads are presented as high quality sinusoidal electrical currents from the supply even if such loads are non linear power electronic devices.

b) An arrangement in accordance with aspects of the present invention may be configured to be tolerant to unbalanced electrical faults by appropriate design or by the addition of suitable control hardware to the electrical distribution network.

c) Ensure that an arrangement is configured to be tolerant of unbalanced faults by employing appropriate control strategies including fast acting control of circuit elements to achieve rebalance or termination.

d) Provide an electromechanical arrangement in which any unbalanced faults are remote and displaced from the actual electrical machine and therefore will not be translated to the mechanical assembly associated with that electrical machine.

With regard to the first approach a) above it will be understood that appropriate specification and consideration will be required to ensure that the network voltage and current drawn by electrical apparatus associated with electrical machine is appropriately specified through a quality specification. Thus by achieving such high standards with regard to load requirements it will be understood that there will be diminution in any potential load torque ripple as presented to the mechanical assembly. Such an approach may provide improvements but generally will not be sufficient to achieve best performance. It will be appreciated that even high quality components may degrade or be inappropriately operated or installed resulting in unbalance across the multiphase power regime of the electrical machine.

Figure 6:
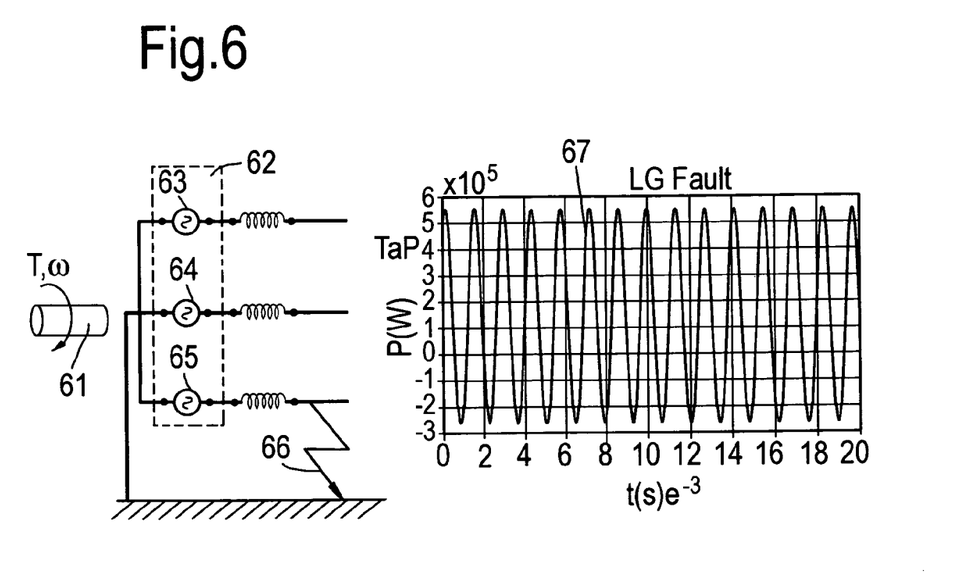
FIG. 6 provides a schematic illustration of an earth fault.
Figure 7:
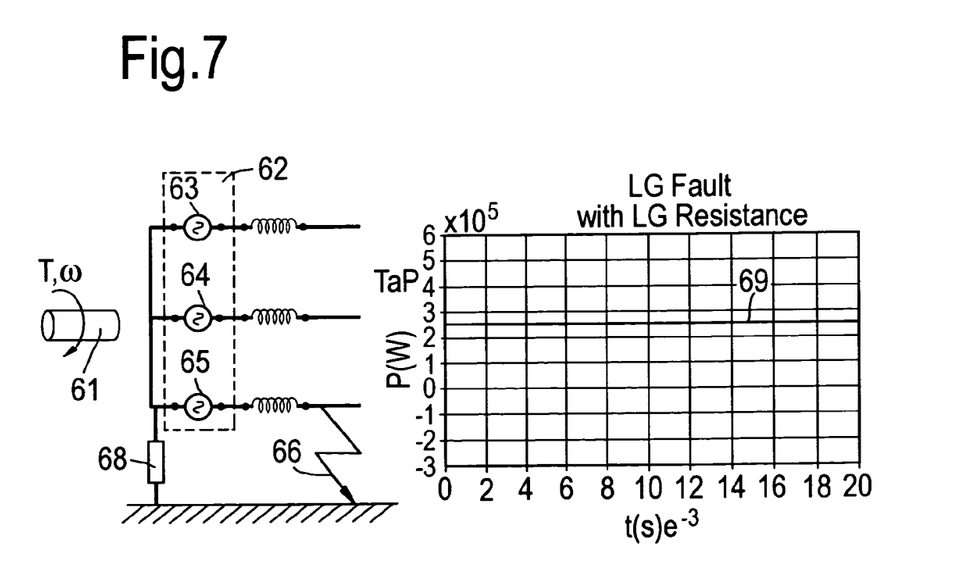
FIG. 7 provides a schematic illustration in accordance with aspects of the present invention of an electromechanical arrangement.

With the second approach b) above it will be understood that implementation can be achieved for unbalanced fault conditions that involve a line to ground fault. FIG. 6 illustrates such a line to ground (LG) fault. As can be seen a mechanical assembly in the form of a shaft 61 is associated with an electrical machine 62 having three phases 63, 64, and 65. Phase 65 has an LG fault 66 which results in oscillations as illustrated by line 67 in a graphical depiction. In order to reduce this oscillation and therefore stressing to the mechanical assembly it will be understood that provision of a neutral earth resistor 68 as depicted in FIG. 7 will result in balance and therefore consistent load as depicted by line 69 graphically. Such neutral earthing resistors 68 will result in an arrangement which is tolerant to fault conditions. It will be understood that particular provision of the resistor 68 will depend upon achieving design and implementation of an arrangement which can both manage earth faults on the electrical distribution system and also minimise torque stresses to the mechanical assembly.

The third approach c) can be utilised with regard to normal electro mechanical operation as well as for electrical faults involving both line to grounds (LG) and line to line (LL) failures. The third approach involves using a controller to dynamically balance electrical loads presented to the electrical machine and in particular the generator terminals when that machine operates as an electrical motor and as a generator driven by a prime mover in the form of a mechanical assembly. It is known to provide electrical phase balancing for use when a large single phase load such as traction equipment is supplied from a three phase network. Such control involves utilisation of reactive power taken from individual phases which can be consolidated using power electronic conversion equipment and used for supplying equipment such as an environmental control system. Such an approach effectively utilises the electrical power conversion apparatus for more than one function. Alternatively, it may be necessary to install dedicated phase balancing equipment to deal with small levels of steady state imbalance and short term but large value imbalances such as a result of electrical faults before protection apparatus operates.

Figure 8:
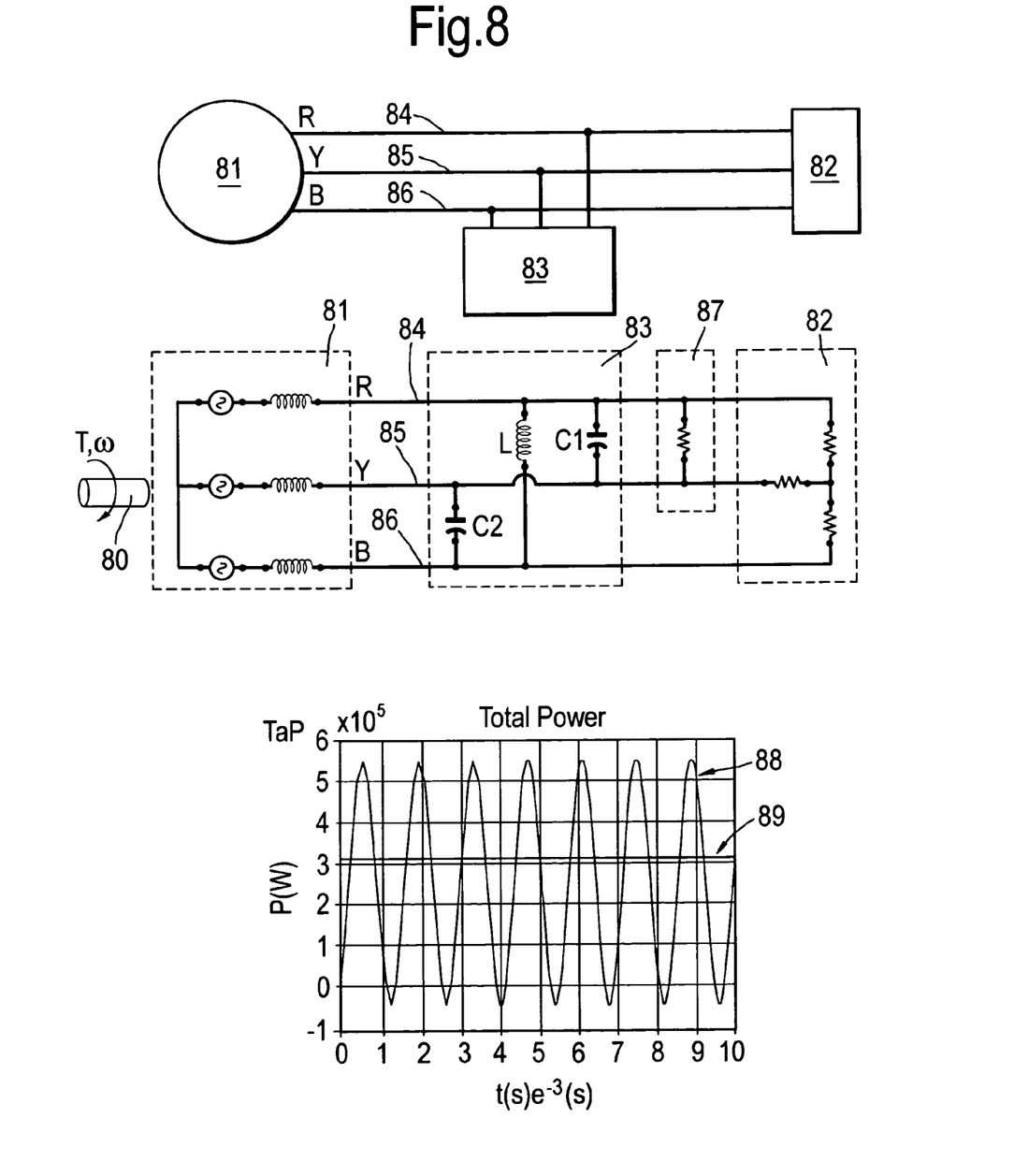
FIG. 8 provides a schematic illustration of phase balancing in accordance with a further embodiment of aspects of the present invention.

FIG. 8 provides illustrations with regard to operation of the third approach as described above. In such circumstances a generator 81 in the form of an electrical machine is associated with a load or plurality of loads 82. In accordance with aspects of the present invention a phase balance device 83 is presented across the phases 84, 85, 86. In such circumstances the phase balancing device 83 acts to mitigate the effects of a line to line (LL) fault 87 on an electrical network coupled to the electrical machine or generator 81. Such an approach dramatically reduces the torque stresses imposed on the mechanical assembly driving the electrical machine 81 in the form of a generator. As indicated above such mechanical assemblies will typically be a gas turbine engine 1 and comprise a shaft 80, 5 and gearbox transmission to deliver primary motion to the electrical machine 81. It will be understood that calculation of the necessary improvements in the phase balance device 83 can be achieved utilising known principles such as the Steinmetz principle (ABB Power Transmission, Multiple SVC Installations for Traction Load Balancing in Central Queensland, Pamphlet A02-0134E). (L Sainz, J Pedra, M Caro "Steinmetz Circuit Influence on the Electrical System Harmonic Response", IEEE Transactions on Power Delivery, vol. 20, No. 2, pp. 1143-1150, 2005). By such an approach balancing across the phase is achieved so reducing mechanical stressing fatigue to the mechanical assembly associated to provide prime movement to the electrical machine 81. Such an approach will improve electrical network power quality resulting in significant advantages with regard to reducing stressing. FIG. 8 includes a graphical depiction of the electrical load oscillation 88 with a line to line fault and the more consistent load response 89 when that load is balanced using a phase balance device 83 as described above. As shown in FIG. 8, the phase balancing device 83 comprises a capacitor $C_1$ electrically connected between phases 84 and 85, a capacitor $C_2$ electrically connected between phases 85 and 86 and an inductance L electrically connected between phases 84 and 86.

The fourth approach d) as described above is to provide an electrical mechanical arrangement in which it is not possible to have a single phase type failure. In such circumstances individual conductors of the three phase loads presented to an electrical machine and the design of the rotating generators are separated and segregated such that individual phase loading can not come into contact through insulation or mechanical failure. One approach would be to provide conversion of the alternating current supply to a direct current supply through a conversion stage. In such circumstances a fault on the direct current supply side manifests itself as a balanced three phase fault as presented to the electrical machine in the form of a generator and therefore the transmitted torque as a result of such oscillations in the electrical load is inherently low and non oscillatory when presented through a mechanical assembly providing prime movement to the electrical machine.

Figure 9:
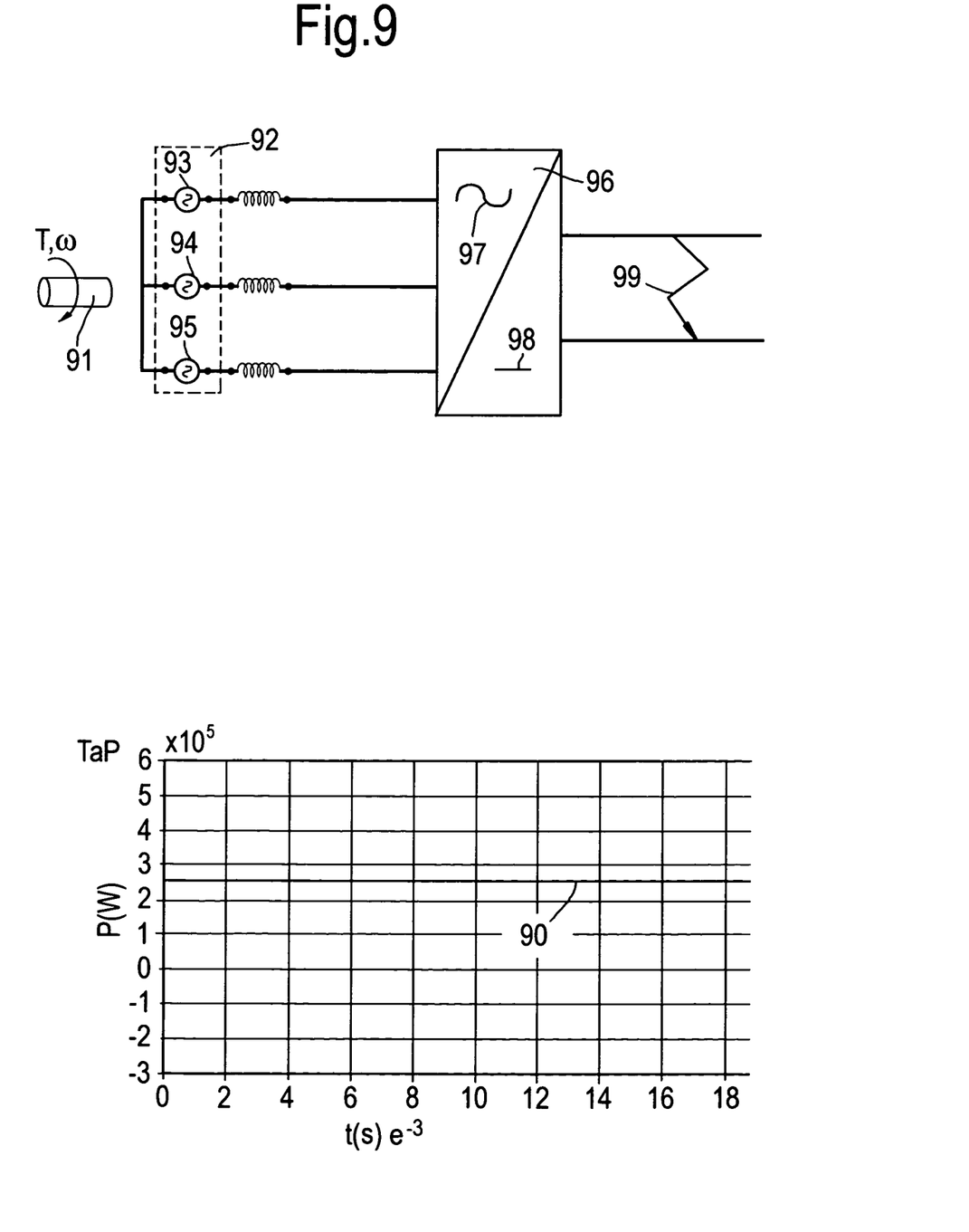
FIG. 9 provides a schematic illustration of a fault and a further second embodiment of aspects of the present invention.

FIG. 9 provides illustrations with regard to the fourth approach in accordance with aspects to the present invention. Thus, a mechanical assembly and in particular a shaft 91 is in association with an electrical machine 92 having three phases 93, 94, 95. These phases 93, 94 and 95 are all coupled to a converter 96 which converts the three phases of the alternating current 97 into a direct electrical current 98. In such circumstances a fault 99 or other change in load as presented to the converter 96 is inherently balanced across the converter 96 as presented through the phases 93, 94, 95 to the shaft 91. In such circumstances as depicted graphically the load 90 is consistent and therefore does not generate abnormal torque in the mechanical assembly.

Figure 10:
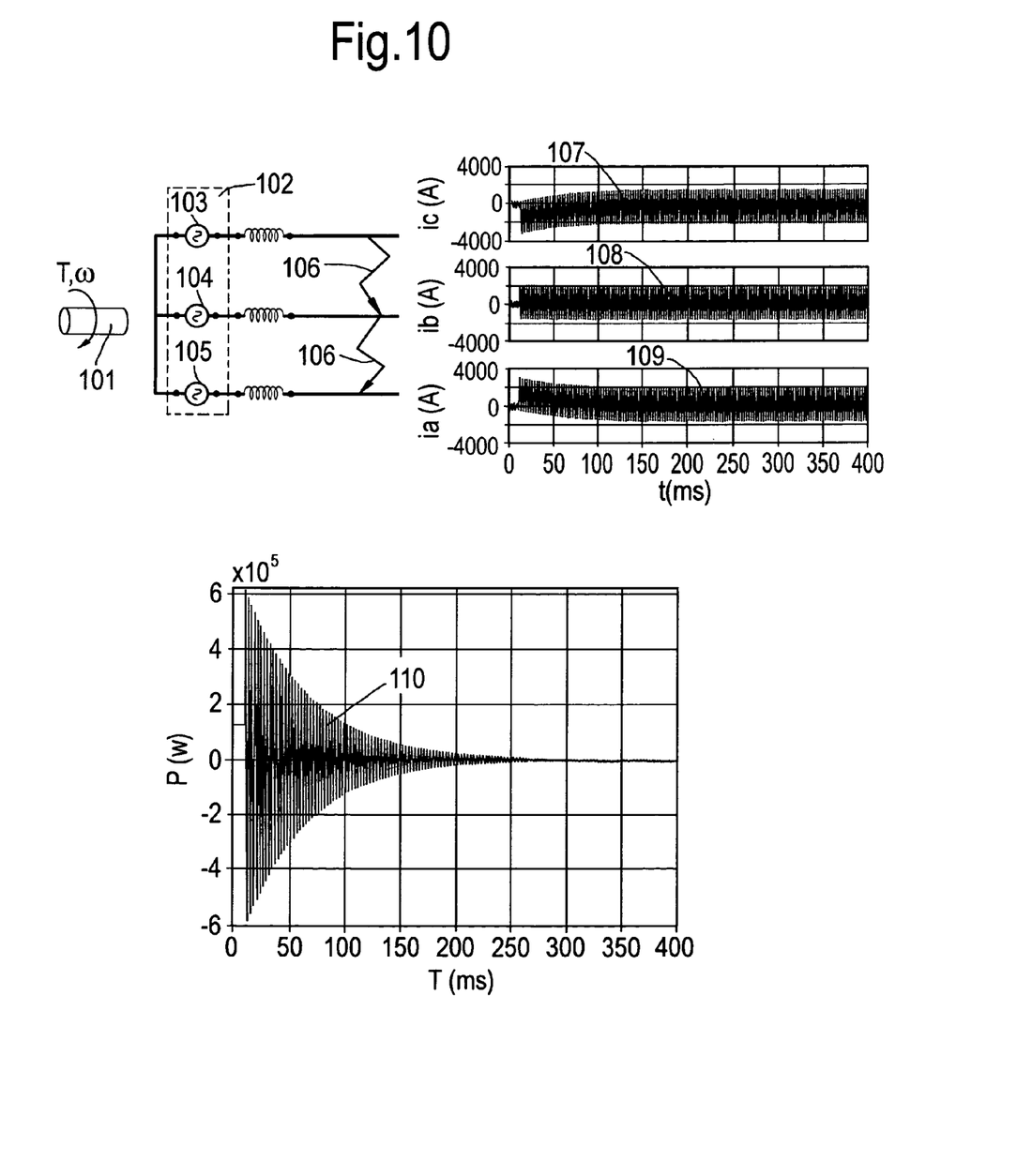
FIG. 10 provides an illustration of a three phase short circuit.

Consideration of electrical loads and balance of such loads across a multi phase electrical power regime as indicated above provides benefits with respect to reducing load oscillations which by implication will be present stress oscillations upon a mechanical assembly. However, it will also be understood in the event of an electrical fault energy is stored within an electrical machine as well as other possible aspects in an electrical distribution system. This load will be discharged and will generally appear as an asymmetric or direct electrical current component which decays to zero. Since there will be a sinusoidal voltage in the presence of a DC current the power provided is also sinusoidal at the supply voltage frequency. Such a situation is created by a 3 phase short circuit in an electrical network associated with an electrical machine which again will result in load oscillations which may cause stressing to an associated mechanical assembly. FIG. 10 illustrates such a 3 phase short circuit. As previously a mechanical assembly and in particular a drive shaft 101 is associated with an electrical machine 102 having three phases 103,104,105. A 3 phase short circuit 106 is presented across all of the phases 103,104,105 and this creates fault current responses 107,108,109 in each of the phase 103, 104,105 respectively.

Although the total current has sunk to zero the total power does not this leaves a decaying sinusoidal transit power immediately after the fault depicted graphically as 110. The time period of this decay is dependant upon the resistance and the inductance of the associated electrical machine. The transient represented by 110 can normally be ignored when rating electrical braking current because the direct current component generally has reached zero by the time the circuit breaker contacts have opened to isolate the fault. However while this DC component is present it will be reflected as a fundamental frequency torque oscillation to a mechanical assembly associated with the electrical machine. This will occur even if the three phase system is completely symmetrical in other respects.

In order to reduce and preferably remove such fundamental frequency oscillation and so reduce mechanical stressing to a mechanical assembly. Aspects to the present invention propose utilisation of one or more of the following techniques. Thus, a) The period of imposed torque stress through oscillation 110 can be reduced by designing appropriate electrically resistive damping to the electrical machine, that is to say the generator.

b) The period and amplitude of imposed torque stress can be reduced by utilising a fast acting controller or a generator control unit.

c) Torque stress can be virtually eliminated if the electrical current itself is controlled by the application of an instantaneous fault current limiting device such as a super conducting fault current limiter or a current limiting diode.

With regard to the first approach a) described above as indicated analysis can show that the time constant is determined by the inductance and resistance of the stator wiring and external cabling to a fault location. It will be appreciated that inductance cannot be easily altered as such inductance is inherently part of the generator structure. However, it is possible to alter and in particular increase the resistance so that the time constants of decay can be reduced. If the internal resistance of the electrical machine and in particular the generator is increased then the fundamental electrical power oscillation decays more rapidly so that any corresponding torque stress is imposed upon an associated mechanical assembly for a shorter period of time.

Figure 11:
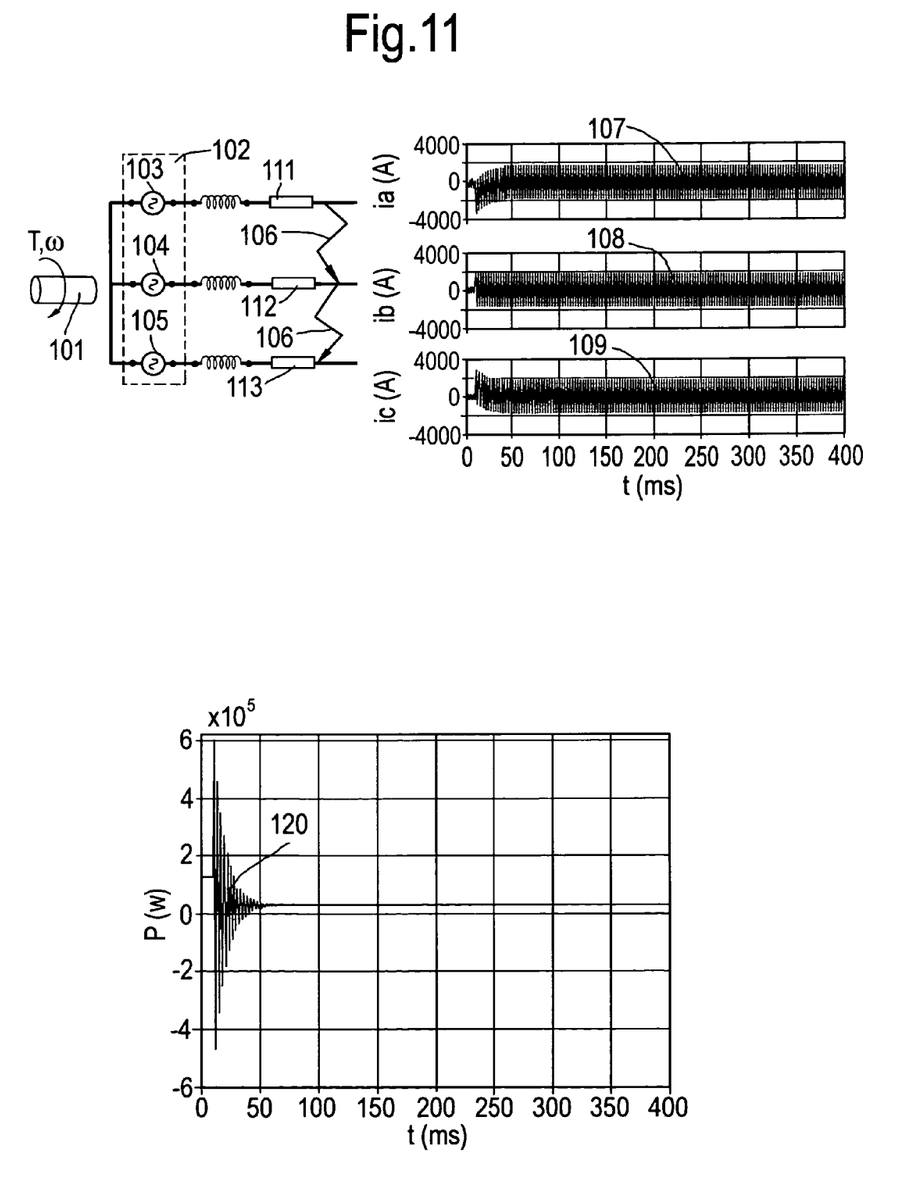
FIG. 11 provides an illustration of a three phase short circuit with a reduced time constant in accordance with aspects of the present invention.

FIG. 11 provides an illustration with regard to electrical machine construction to reduce the time constant of decay. As illustrated above with regard to FIG. 10 a shaft 101 is associated with an electrical machine 102 which operates in accordance with a multiphase and as illustrated a three phase 103,104,105 power regime. A fault 106 occurs across the phases 103,104,105 and as previously fault currents 107,108, 109 are respectively presented. However, in comparison with FIG. 10 it will be noted that additional internal electrical resistance 111,112,113 is presented upon each phase. In such circumstances the time period of oscillation to decay is depicted graphically as 120 and is much shorter and therefore the period of mechanical stressing to the mechanical assembly as a result of oscillatory electrical loading to the electrical machine is significantly reduced.

The second approach b) with regard to three phase short circuiting as indicated is to use a generator control unit in order to rapidly dampen excitation presented upon each rotor of the electrical machine. When a large fault current is detected the corresponding excitation can be reduced so decreasing the generated voltage for that phase. Such an approach leads to a reduction in current flowing and so can be used to damp out fundamental power oscillations after the initial rise in fault current has been detected.

Figure 12:
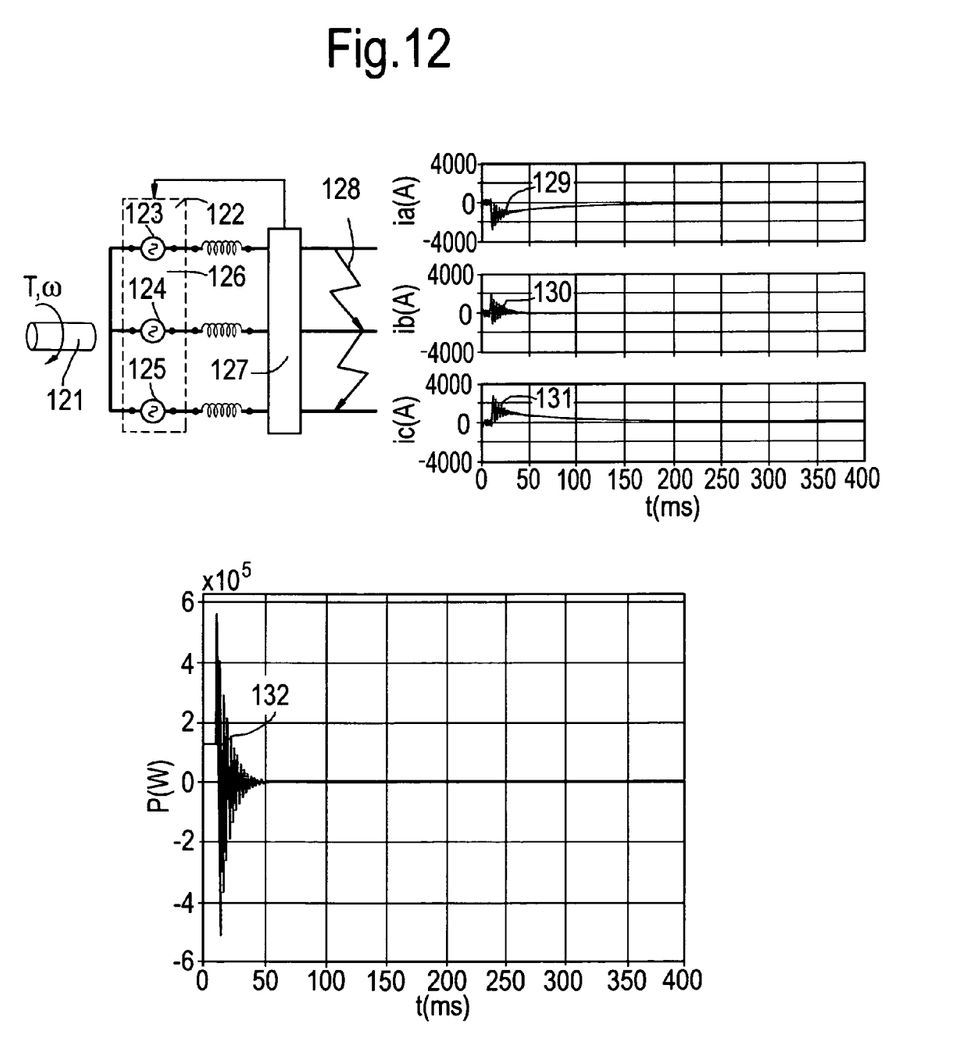
FIG. 12 provides an illustration of a three phase short circuit with a control unit in accordance with aspects of the present invention; and, FIG. 13 provides an illustration of a three phase short circuit with current limiter devices in accordance with aspects of the present invention.

FIG. 12 shows and illustrates utilisation of a generator control unit in order to reduce the excitation field here depicted exponentially during fault conditions. As previously a mechanical assembly depicted by a drive shaft 121 is associated with an electrical machine 122 which has three phases 123, 124,125. Within the electrical machine 122 a controller 126 is provided. The controller 126 is associated with a voltage control 127 across the phases 123, 124,125. In such circumstances when a fault 128 is presented across the phases 123,124,125 as depicted oscillations 129,130,131 are presented respectively to the phases 123,124,125. However through use of the generator controller 126 and voltage control 127 as indicated above the excitation field is reduced upon each phase of the electrical machine 122 in which a fault is detected by decreasing the generated voltage through the voltage control 127. This leads to a reduction in current flowing and is used to damp out fundamental power oscillations after an initial rise in fault current is detected. In such circumstances the decay period as depicted graphically by 132 is significantly reduced and therefore the period of torque stressing to an associated mechanical assembly is similarly reduced. The first a) and second b) approaches as defined above aim to modify the electrical machine in terms of a generator system in order to eliminate the torque stressing period. A third approach c) operates differently in that an additional component is provided to each phase to prevent fault currents from flowing. Such a limitation on current can be achieved through a current limiting diode (CLD) or super conducting fault current limiter (SFCL). Both these devices are fast acting and will respond to fault currents typically within one quarter cycle. In such circumstances when an electrical current rises above a certain threshold, a resistance or where possible an inductance is greatly increased to prevent the fault current from continuing. With no electrical fault current in each phase there will be no power oscillation and so no fundamental frequency stress torque created within an associated mechanical assembly.

Figure 13:
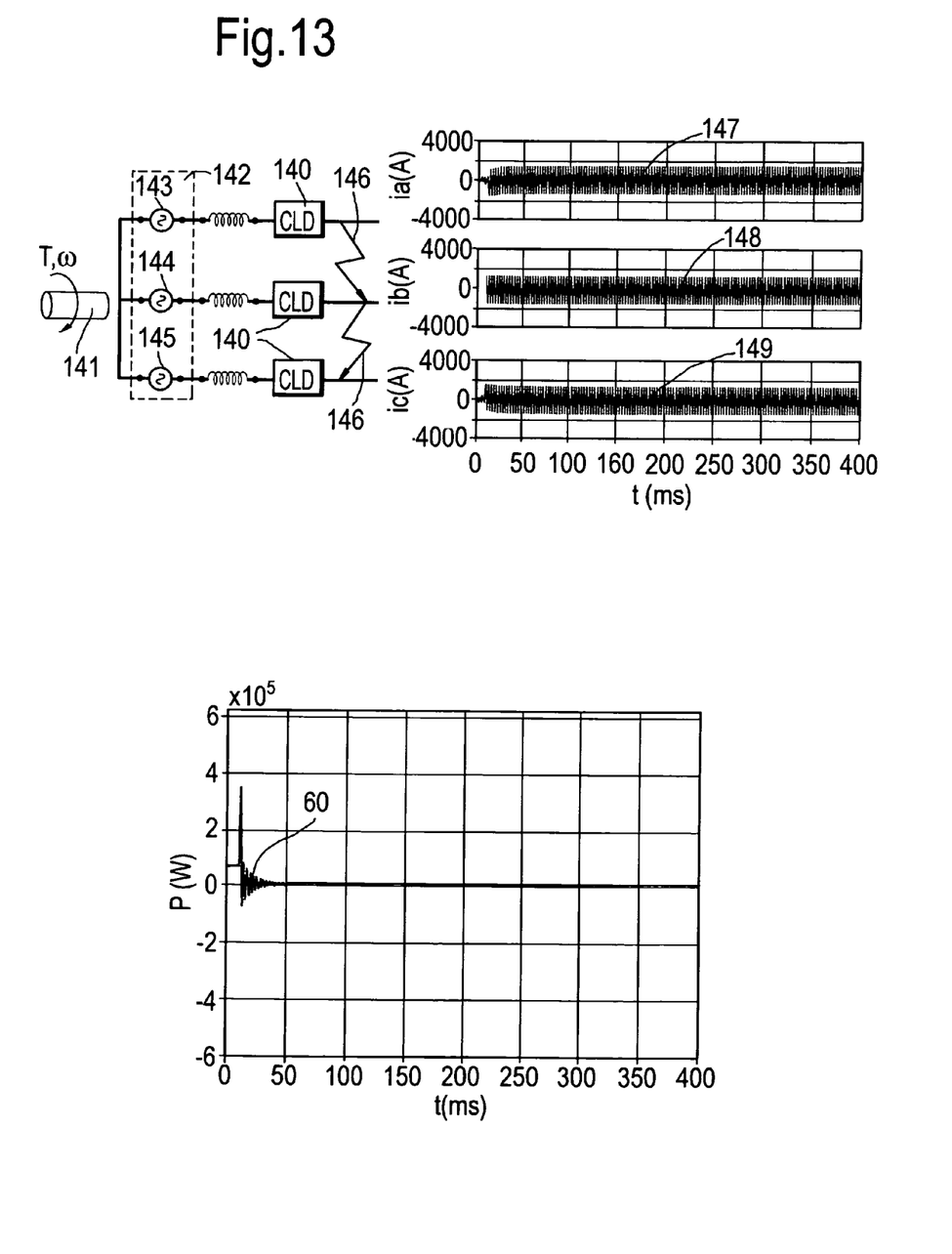

FIG. 13 provides an illustration of utilisation of a current limiting device in accordance with aspects of the present invention. Thus, as previously a mechanical assembly and in particular a drive shaft 141 is associated with an electrical machine 142 having three phases 143,144,145. In such circumstances a three phase short circuit fault 146 when presented across the phases 143,144,145 results in respective fault currents 147,148,149 upon the phases 143,144,145. In accordance with the third approach a current limiter device 140 is respectively placed in the supply for each phase 143, 144,145 whereby the decay period for the load oscillation and therefore the torque oscillation presented to the mechanical assembly and depicted graphically as 150 is significantly reduced both in absolute terms as well as in terms of decay period. In such circumstance the mechanical assembly will be exposed to such potential torque oscillations for a much shorter period of time.

Aspects to the present invention are particularly directed towards reducing mechanical torque stress as presented to a mechanical assembly and in particular vulnerable transmission components between electrical machines and that mechanical assembly. By reducing oscillations in the electrical load presented to the electrical machine, less stressing will be transmitted to the mechanical device and generally less stress will be created upon the mechanical assembly and therefore increasing that assembly's life span and potentially reducing necessary requirements with regard to weight and size of components to accommodate for such stressing in the mechanical assembly.

Generally as indicated aspects of the present invention are particularly important with regard to situations where weight, size and space are important and where a proportion of the electrical power taken from the prime mover mechanical assembly is relatively high and therefore problems with regard to load variations may be significant. In such circumstances aspects of the present invention relate to utilisation of electro mechanical arrangements in such situations as aerospace, marine, industrial or energy utilisation. Aspects to the present invention aim to reduce electrical load oscillation and therefore translation of that electrical load stressing upon the mechanical assembly. By smoothing such electrical load oscillations it will be understood that unbalance with regard to extraction or application of electrical load through an electrical load through an electrical machine can be altered such that the asymmetry can be altered is not transferred to the transfer mechanism in terms of the mechanical transmission or mechanical transmissions or mechanical assembly itself. The prime mover may be a gas turbine engine or an internal combustion engine, e.g. a diesel engine or a petrol engine. It is possible to combine the arrangement shown in FIG. 8 with the any one or more of the arrangements shown in FIGS. 7, 9, 11, 12 and 13.

Modifications and alterations to aspects of the present invention will be appreciated by persons skilled in the technology. Thus for example it will be understood that the processes with regard to smoothing electrical load and/or decreasing the decay time for a three phase short circuit electrical charge dissipation can be permanently associated with the electro mechanical arrangement or selectively switched into the arrangement when required. It will also be understood that the severity of the processes in terms of application of an electrical current limiter device or utilisation of resistors can be changed to alter the decay time or the closeness of the balance between the phases dependant upon requirements.

We claim:

1. An electromechanical arrangement configured to maintain electrical power balancing across a plurality of phases of a multi-phase power regime to reduce torque oscillations presented to a mechanical assembly of the electromechanical arrangement, comprising:
the mechanical assembly including a prime mover;
an electrical machine coupled to the mechanical assembly for reciprocal drive, the electrical machine including the plurality of phases, the multi-phase power regime generated by the prime mover or for driving the prime mover, and a controller arranged across each phase; and
a phase balancing device presented across the plurality of phases of the electrical machine, wherein
the electrical machine is configured to supply power from the multi-phase power regime to a multi-phase electrical load.

2. The electromechanical arrangement of claim 1, wherein the phase balancing device includes a first capacitor electrically connected between a first phase and a second phase, a second capacitor electrically connected between the second phase and a third phase, and an inductance electrically connected between the first phase and the third phase.

3. The electromechanical arrangement of claim 1, the electrical machine further including balanced linear elements that draw or provide consistent sinusoidal electrical current for each phase of the multi-phase power regime.

4. The electromechanical arrangement of claim 1, wherein the electromechanical arrangement is configured to limit and/ or isolate unbalanced electrical faults or deviations to each phase to achieve balance across all the phases of the multi-phase power regime.

5. The electromechanical arrangement of claim 4, further comprising:
a neutral earthing resistor electrically connected to the electrical machine.

6. The electromechanical arrangement of claim 1, wherein any unbalances in the phases of the multi-phase power regime are displaced from the electrical machine to a position in the power couplings remote from any association directly with the mechanical assembly.

7. The electromechanical arrangement of claim 6, further comprising:
a converter to convert alternating electrical current to direct electrical current.

8. The electromechanical arrangement of claim 1, wherein the multi-phase power regime has exactly three phases.

9. The electromechanical arrangement of claim 1, further comprising:
a fault current limiter in each phase that reduces the time period of oscillatory electrical loading and mechanical stressing of the mechanical assembly.

10. The electromechanical arrangement of claim 9, wherein the fault current limiter is selected from a group consisting of a current limiting diode and a superconducting fault current limiter.

11. The electromechanical arrangement of claim 1, wherein
the controller is configured to control the phases of the electrical machine and to reduce the time period of oscillating electrical, loading and mechanical stressing, and
the electrical machine further includes a voltage controller associated with the controller, the voltage controller is arranged across each phase and reduces an excitation field in each phase of the electrical machine in which a fault is detected.

12. The electromechanical arrangement of claim 1, wherein each phase of the electrical machine has an additional internal resistance that reduces the time period of oscillating electrical loading and mechanical stressing of the mechanical assembly.

13. The electromechanical arrangement of claim 1, wherein the prime mover includes a gas turbine engine.

14. The electromechanical arrangement of claim 1, wherein the multi-phase electrical load includes three-phase linear elements.

15. The electromechanical arrangement of claim 2, wherein the multi-phase electrical load includes three-phase linear elements.

16. An electromechanical arrangement configured to maintain electrical power balancing across a plurality of phases of a multi-phase power regime to reduce torque oscillations presented to a mechanical assembly of the electromechanical arrangement, comprising:
the mechanical assembly including a prime mover arranged to provide propulsion;
an electrical machine coupled to the mechanical assembly for reciprocal drive, the electrical machine including a plurality of phases, the multi-phase power regime generated by the prime mover or for driving the prime mover, and a controller arranged across each phase; and
a phase balancing device presented across the plurality of phases of the electrical machine, wherein
the electromechanical arrangement is selected from a group consisting of an aerospace electromechanical arrangement and a marine electromechanical arrangement.

17. The electromechanical arrangement of claim 16, wherein
the controller is configured to control the phases of the electrical machine and to reduce the time period of oscillating electrical loading and mechanical stressing, and
the electrical machine further includes a voltage controller associated with the controller, the voltage controller is arranged across each phase and reduces an excitation field in each phase of the electrical machine in which a fault is detected.

18. An electromechanical arrangement configured to maintain electrical power balancing across a plurality of phases of a multi-phase power regime to reduce torque oscillations presented to a mechanical assembly of the electromechanical arrangement comprising:
the mechanical assembly including a prime mover arranged to provide propulsion;
an electrical machine coupled to the mechanical assembly for reciprocal drive, the electrical machine including a plurality of phases, the multi-phase power regime generated by the prime mover or for driving the prime mover, and a controller arranged across each phase; and
a short-term phase balancing device selectively switched across the plurality of phases of the electrical machine that maintains power balancing during electrical power imbalances due to electrical faults.

19. The electromechanical arrangement of claim 18, wherein
the controller is configured to control the phases of the electrical machine and to reduce the time period of oscillating electrical loading and mechanical stressing, and
the electrical machine further includes a voltage controller associated with the controller, the voltage controller is arranged across each phase and reduces an excitation field in each phase of the electrical machine in which a fault is detected.

* * * * *